US010848227B2

(12) United States Patent
Frerking et al.

(10) Patent No.: US 10,848,227 B2
(45) Date of Patent: *Nov. 24, 2020

(54) OPTIMAL UTILIZATION OF MULTIPLE TRANSCEIVERS IN A WIRELESS ENVIRONMENT

(71) Applicant: AT&T MOBILITY II LLC, Atlanta, GA (US)

(72) Inventors: Melvin D. Frerking, Eastman, GA (US); Alain Ohana, Aventura, FL (US); David Shively, Smyrna, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/130,430

(22) Filed: Sep. 13, 2018

(65) Prior Publication Data

US 2019/0013856 A1     Jan. 10, 2019

Related U.S. Application Data

(63) Continuation of application No. 14/874,887, filed on Oct. 5, 2015, now Pat. No. 10,090,904, which is a (Continued)

(51) Int. Cl.
*H04B 7/06*     (2006.01)
*H04B 7/08*     (2006.01)
(Continued)

(52) U.S. Cl.
CPC ......... *H04B 7/0632* (2013.01); *H04B 7/0413* (2013.01); *H04B 7/0691* (2013.01);
(Continued)

(58) Field of Classification Search
CPC .. H04B 7/0632; H04B 7/0697; H04B 17/336; H04B 7/0413; H04B 7/0691;
(Continued)

(56) References Cited

U.S. PATENT DOCUMENTS 6,236,363 B1 *  5/2001  Robbins ................ H01Q 3/267
                                                        342/169
6,802,035 B2   10/2004  Catreux et al.
(Continued)

OTHER PUBLICATIONS

Non-Final Office Action received for U.S. Appl. No. 11/958,674 dated Jan. 31, 2011, 18 pages.
(Continued)

*Primary Examiner* — Thinh D Tran
(74) *Attorney, Agent, or Firm* — Amin, Turocy & Watson, LLP

(57) ABSTRACT

Switching between and/or combining various multi-transceiver wireless communication techniques based on a determined characteristic of a network or a wireless link is described herein. As an example, a characteristic such as signal to noise ratio (SNR), multi-path scattering, available bandwidth, or the like, can be determined. The characteristic can then be compared with suitable thresholds for various multi-transceiver communication techniques, such as MIMO, multi-channel concatenation, channel diversity, and so on. Based on a comparison of the characteristic and the thresholds, a suitable multi-transceiver technique can be selected and implemented for the wireless link. Accordingly, a network can provide increased data rates and/or channel quality from a multi-transceiver technique that is most suited to prevailing conditions of the wireless network/link.

20 Claims, 14 Drawing Sheets

Related U.S. Application Data continuation of application No. 11/958,674, filed on Dec. 18, 2007, now Pat. No. 9,185,601.

(51) Int. Cl.

| | | |
|---|---|---|
| *H04L 1/00* | (2006.01) | |
| *H04W 28/20* | (2009.01) | |
| *H04B 17/336* | (2015.01) | |
| *H04B 7/0413* | (2017.01) | |
| *H04L 1/06* | (2006.01) | |
| *H04L 1/08* | (2006.01) | |

(52) U.S. Cl.
CPC ......... *H04B 7/0693* (2013.01); *H04B 7/0697* (2013.01); *H04B 7/0877* (2013.01); *H04B 17/336* (2015.01); *H04L 1/0001* (2013.01); *H04W 28/20* (2013.01); *H04L 1/06* (2013.01); *H04L 1/08* (2013.01)

(58) Field of Classification Search
CPC ... H04B 7/0693; H04B 7/0877; H04W 28/20; H04L 1/0001; H04L 1/06; H04L 1/08
See application file for complete search history.

(56) References Cited

U.S. PATENT DOCUMENTS

| | | | |
|---|---|---|---|
| 7,280,804 B2 | 10/2007 | Jacobsen et al. | |
| 7,436,757 B1 | 10/2008 | Wilson et al. | |
| 7,697,959 B2 | 4/2010 | Li et al. | |
| 7,711,374 B2 | 5/2010 | Karaoguz et al. | |
| 8,050,697 B2 | 11/2011 | Jia et al. | |
| 8,675,743 B2 | 3/2014 | Kotecha et al. | |
| 2002/0064246 A1* | 5/2002 | Kelkar | H04B 7/0845 375/347 |
| 2006/0083195 A1* | 4/2006 | Forenza | H04B 7/0689 370/328 |
| 2006/0121946 A1 | 6/2006 | Walton et al. | |
| 2008/0146153 A1 | 6/2008 | Grosspietsch et al. | |
| 2008/0317014 A1* | 12/2008 | Veselinovic | H04L 1/0001 370/380 |
| 2010/0020757 A1* | 1/2010 | Walton | H04L 5/0044 370/329 |
| 2010/0189055 A1 | 7/2010 | Ylitalo | |
| 2012/0188881 A1 | 7/2012 | Ma et al. | |

OTHER PUBLICATIONS

Final Office Action received for U.S. Appl. No. 11/958,674 dated Jul. 20, 2011, 21 pages.
Non-Final Office Action received for U.S. Appl. No. 11/958,674 dated Jul. 29, 2014, 21 pages.
Final Office Action received for U.S. Appl. No. 11/958,674 dated Feb. 25, 2015, 22 pages.
Notice of Allowance received for U.S. Appl. No. 11/958,674 dated Jul. 6, 2015, 12 pages.
Non-Final Office Action received for U.S. Appl. No. 14/874,887 dated Apr. 26, 2017, 26 pages.
Final Office Action received for U.S. Appl. No. 14/874,887 dated Oct. 17, 2017, 20 pages.

\* cited by examiner

OPTIMAL UTILIZATION OF MULTIPLE TRANSCEIVERS IN A WIRELESS ENVIRONMENT

RELATED APPLICATION

This non-provisional patent application is a continuation of, and claims priority to each of, U.S. patent application Ser. No. 14/874,887 (now U.S. Pat. No. 10,090,904), filed Oct. 5, 2015, and entitled, "OPTIMAL UTILIZATION OF MULTIPLE TRANSCEIVERS IN A WIRELESS ENVIRONMENT," which is a continuation of U.S. patent application Ser. No. 11/958,674 (now U.S. Pat. No. 9,185,601), filed Dec. 18, 2007, and entitled, "OPTIMAL UTILIZATION OF MULTIPLE TRANSCEIVERS IN A WIRELESS ENVIRONMENT," the entireties of which applications are hereby incorporated by reference herein.

BACKGROUND

As numbers of mobile communication device users and mobile service subscribers continue to increase, the demand placed on mobile network components to provide remote communication services for such devices and subscribers increases commensurately. To compound this problem, today's mobile devices (e.g., mobile phones, personal digital assistants (PDAs), etc.) can be utilized as full-service computing mechanisms. For example, many of the most recent and advanced mobile devices can be associated with word processing software, web browsing software, electronic mail software, accounting software, and various other types of software. In general, applications heretofore available only by way of computing devices and/or Internet protocol (IP) based network devices are now available on such mobile devices. This expansion in capability of mobile devices can often lead to a desire for higher data rates and higher quality wireless communication. As an example, streaming data services, such as streaming video or streaming audio, can often perform in a more satisfactory manner if a sufficiently high data rate and/or sufficienty high channel quality are available for a wireless link providing the streaming data service.

Although higher data rates are typically sought after, not all wireless service providers provide a common data rate. On the contrary, various service providers can offer a range of bandwidths or data rates for IP-based subscriber traffic, depending on capabilities of a provider's network. Accordingly, mobile networks typically must accommodate processing and channel bandwidth resources for circuit-switched voice communication as well as packet-switched data communication of various data rates. Various mechanisms for increasing data rates for mobile calls have been implemented. One common way is simply to increase channel bandwidth. However, this is not always a viable result where a network is bandwidth limited, especially in densely populated urban areas. Thus, additional mechanisms for increasing network bandwidth, while preserving network capacity and call quality, are constantly sought after by wireless carriers.

DETAILED DESCRIPTION

Figure 1:
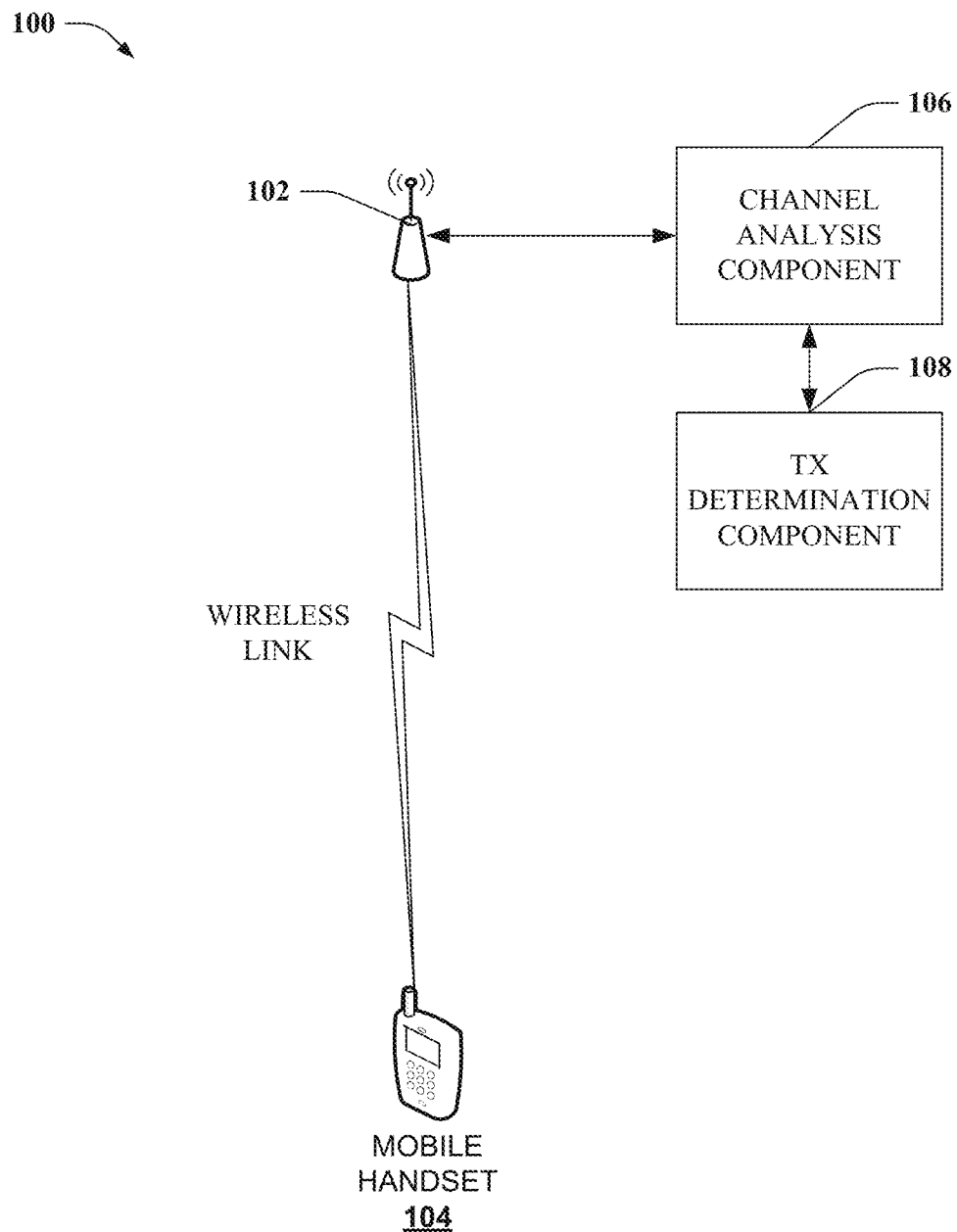
FIG. 1 depicts a block diagram of a sample system that provides alternative multi-transceiver communication techniques for a wireless link.

The application is now described with reference to the drawings, wherein like reference numerals are used to refer to like elements throughout. In the following description, for purposes of explanation, numerous specific details are set forth in order to provide a thorough understanding thereof. It may be evident, however, that various embodiments of the application can be practiced without these specific details. In other instances, well-known structures and devices are shown in block diagram form in order to facilitate a description thereof.

As used in this application, the terms "component," "system," "equipment," "interface", "network," and/or the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

The subject disclosure provides for switching between and/or combining various multi-transceiver wireless communication techniques. Switching between and/or combining techniques can be based on a channel characteristic associated with a particular wireless link. If the channel characteristic rises above a certain threshold, a first multi-transceiver technique can be used. If the channel characteristic is above a second threshold and/or below the first threshold, a second multi-transceiver technique can be used, and so on. In addition, suitable multi-transceiver techniques can be combined based on a comparison of the channel characteristic and the threshold. Accordingly, a suitable multi-transceiver technique can be chosen to provide optimal data rate and/or channel quality based on determinable wireless conditions.

According to one or more further aspects of the subject disclosure, a base station can form a wireless link with a mobile handset and obtain a signal to noise (SNR) level and/or a multi-path scattering level of the wireless link. Such level(s) can be measured, calculated and/or quantified at the mobile handset, the base station, or both. If the multi-path scattering level rises above a first threshold, a multi-data stream, single channel technique can be utilized to increase data rates for the wireless link as compared with single transceiver operation. If the SNR level is above a second threshold and/or the multi-path scattering level is below the first threshold, a multi-channel concatenation technique can be utilized to provide increased data rates. Alternatively, or in addition to the multi-data stream and the multi-channel techniques, if the SNR is below the second threshold, a multi-transceiver diversity technique can be utilized to provide increased quality for the wireless link. As described, the subject disclosure can analyze concurrent conditions of the wireless link to provide a multi-transceiver communication technique most suited for the concurrent conditions.

According to still other aspects, a base station can combine multi-transceiver communication techniques to provide increases data rate and channel quality as compared with typical communication. For instance, if a multi-path scattering level associated with a wireless link is relatively low, multi-channel concatenation can be utilized to increase typical wireless data rates. In addition, if a mobile handset has suitable processing capability, two or more signals can each be received by two or more handset transceivers over separate channels, assuming such channels utilize a substantially common frequency band. The signals received by each of the two or more transceivers can be processed by the mobile handset to provide receive diversity for two or more channels. As a result, increased data rate can be provided in conjunction with increased channel quality as compared with conventional techniques.

To the accomplishment of the foregoing and related ends, certain illustrative aspects of the disclosed embodiments are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

FIG. 1 depicts a block diagram of a sample system 100 that provides alternative multi-transceiver communication techniques for a wireless link between a mobile network base station 102 and a mobile handset 104. Selecting between alternative communication techniques can be based at least in part on a characteristic of the wireless link. By comparing such characteristics with one or more threshold factors associated with the multi-transceiver communication techniques, a technique can be selected that provides increased data rate and/or channel quality compared with conventional techniques (e.g., single transceiver wireless communication).

System 100 can include a channel analysis component 106 that obtains a channel characteristic of the wireless link between the mobile base station 102 and the mobile handset 104. For instance, the mobile handset can analyze the wireless link and/or data transmitted via the link to determine a block error rate (BER) associated with such data. The BER can be utilized to determine a signal to noise ratio (SNR) for the wireless link and/or a channel quality indicator (CQI) of such link. These parameters, BER, SNR, CQI, can provide compatibility information for various multi-transceiver communication techniques. For instance, a relatively high SNR can be beneficial for multi-channel concatenation. Further, antenna diversity can be utilized to increase channel quality if a wireless link has relatively low SNR.

In addition to the foregoing, the wireless link can be analyzed to determine scattering conditions associated with wireless transmission between the base station 102 and the mobile handset 104. Scattering conditions (e.g., resulting from buildings, landmasses and other physical objects that can reflect wireless transmissions) can be utilized in conjunction with some multi-transceiver communication techniques to achieve increased data rates on a single frequency channel (e.g., multiple input multiple output [MIMO] transmission and/or variations thereof). For example, typical wireless transmission architectures can often have a maximum data rate for a single data stream transmitted by a single antenna. However, the data rate can be increased by splitting the data stream into multiple streams transmitted by multiple antennas (102) over a common frequency band (e.g., by way of spatial multiplexing). To decode the split streams, a receiver (104) requires a mechanism to receive the multiple streams and process and recombine them. Multi-path scattering can provide such a mechanism. Scattering in a wireless link can cause a signal to exhibit spatial distortion at a receiving device (104). Such distortion can be utilized to distinguish the multiple data streams at a receiver. Accordingly, the multiple streams can be decoded even though they are transmitted on a common frequency band. Therefore, under proper multi-path scattering and SNR conditions, a signal can be split into multiple transmissions by a multi-transceiver emitter to increase overall data rates for the signal.

A characteristic of the wireless link, such as SNR and/or multi-path scattering factor, can be measured at the mobile device 104 or the base station 102. If measured at the mobile device 104, the characteristic can be transmitted to the base station 102 over the wireless link. A determination component 108 can then compare the channel characteristic to a predetermined threshold associated with one or more multi-transceiver communication techniques. A result of the comparison can be used to determine whether the mobile handset 104 can obtain a higher quality or higher data rate by employing multiple signals on a single channel or on multiple channels of the wireless link. For instance, if a multi-path scattering level meets a predetermined threshold, a transmission can be split into multiple data streams on a single frequency channel (e.g., in a MIMO arrangement). Alternatively, or in addition, if a SNR of the wireless link rises above a quality threshold, a multi-channel concatenation technique can be used where a signal is transmitted over two separate channels (e.g. separate frequencies) concurrently to provide an increased data rate. Furthermore, if the SNR of the wireless link is below the quality threshold, a diversity-based receive or transmit mode can be utilized to improve transmission quality in the wireless link. Accordingly, system 100 can select a multi-transceiver communication technique suitable to the characteristic of the wireless link.

In addition to the foregoing, it should be appreciated that the claimed subject matter can be implemented as a method, apparatus, or article of manufacture using typical programming and/or engineering techniques to produce software, firmware, hardware, or any suitable combination thereof to control a computing device, such as a mobile handset, to implement the disclosed subject matter. The term "article of manufacture" as used herein is intended to encompass a computer program accessible from any suitable computer-readable device, media, or a carrier generated by such media/device. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, it should be appreciated that a carrier wave generated by a transmitter can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the terms to "infer" or "inference", as used herein, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 2A:
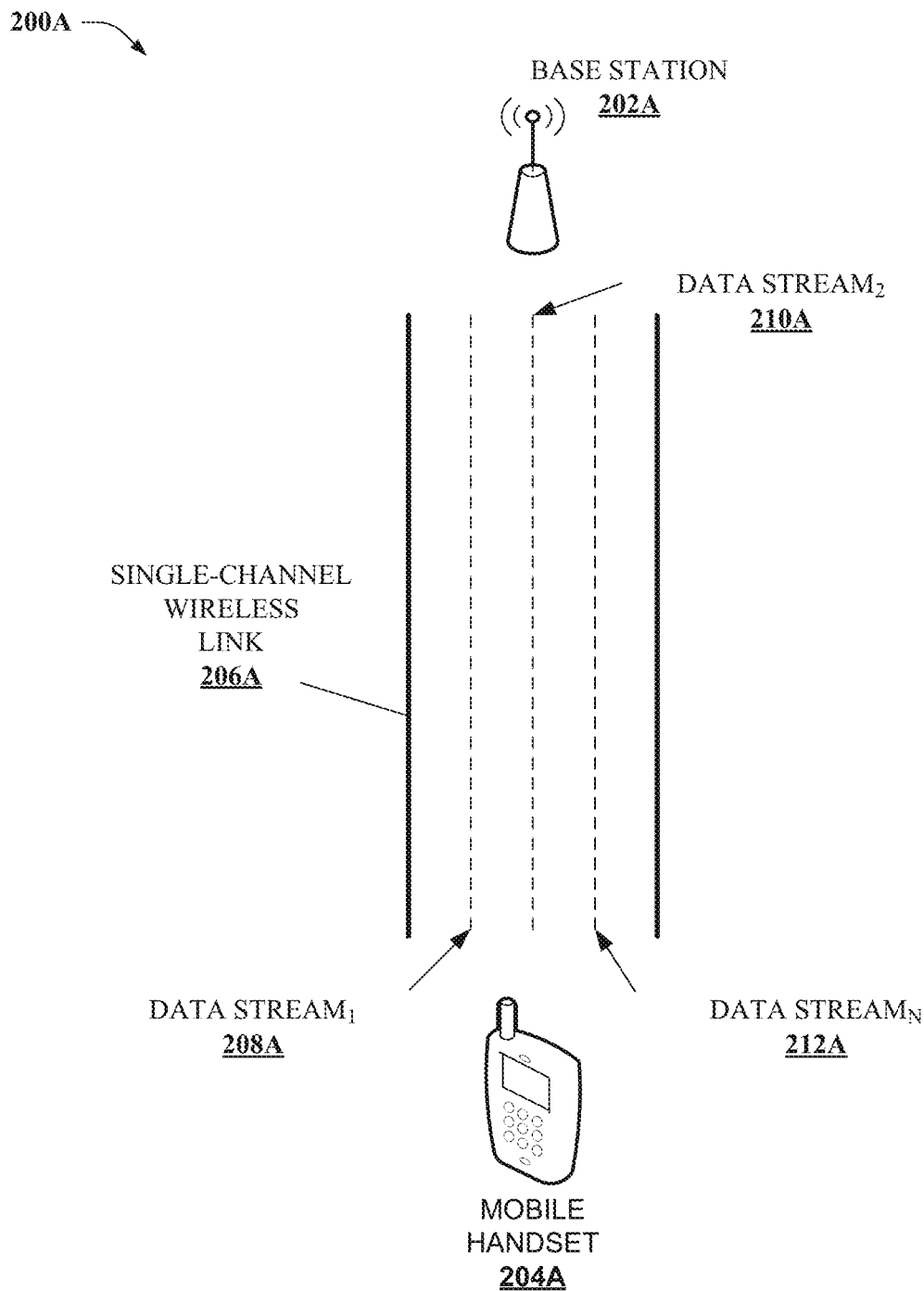
FIG. 2A illustrates a sample depiction of a multiple input multiple output (MIMO) technique for a wireless link between a base station and a mobile handset.
Figure 2B:
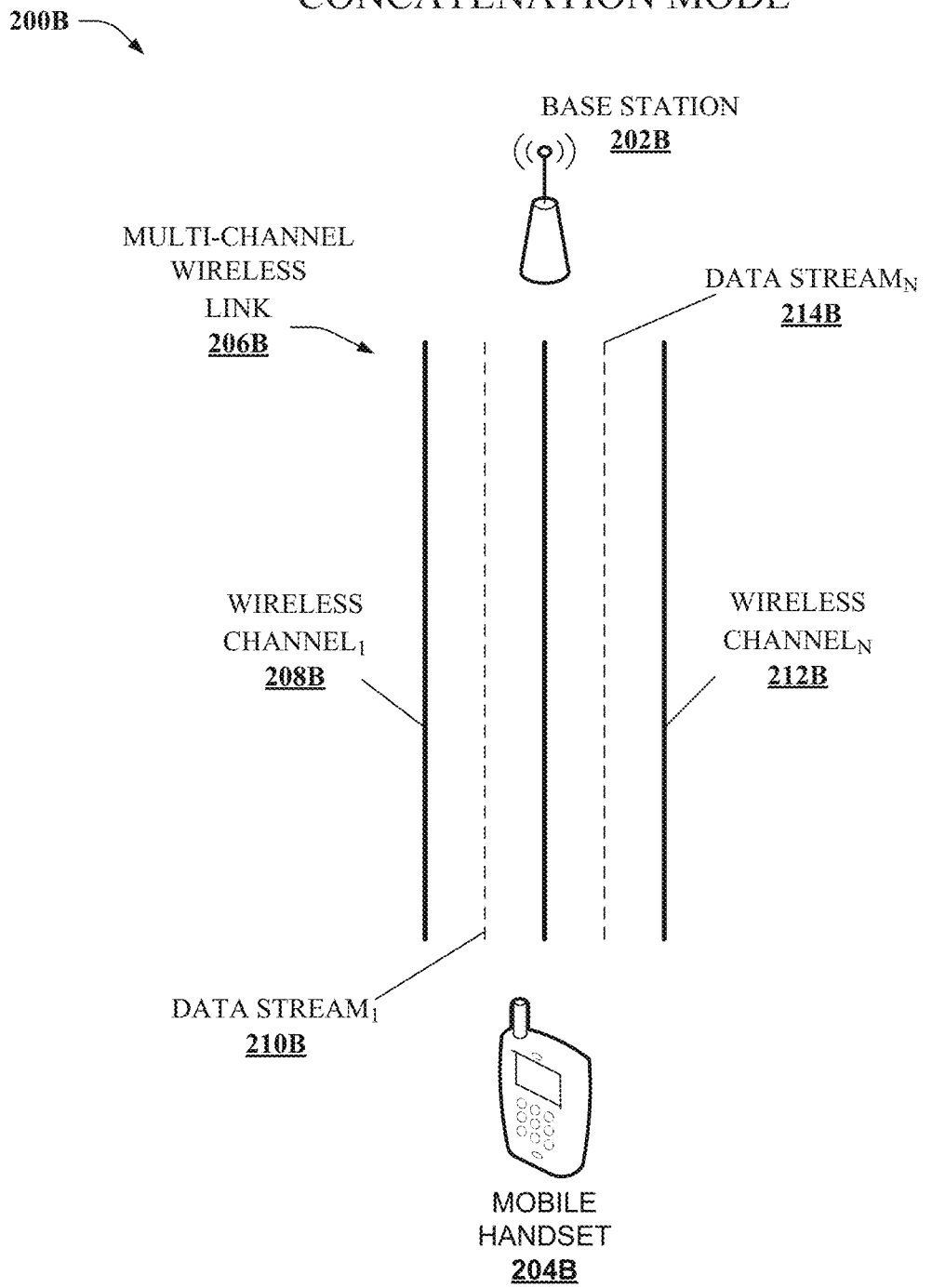
FIG. 2B illustrates a sample depiction of a multi-channel concatenation technique for a wireless link utilizing multiple channels.
Figure 2C:
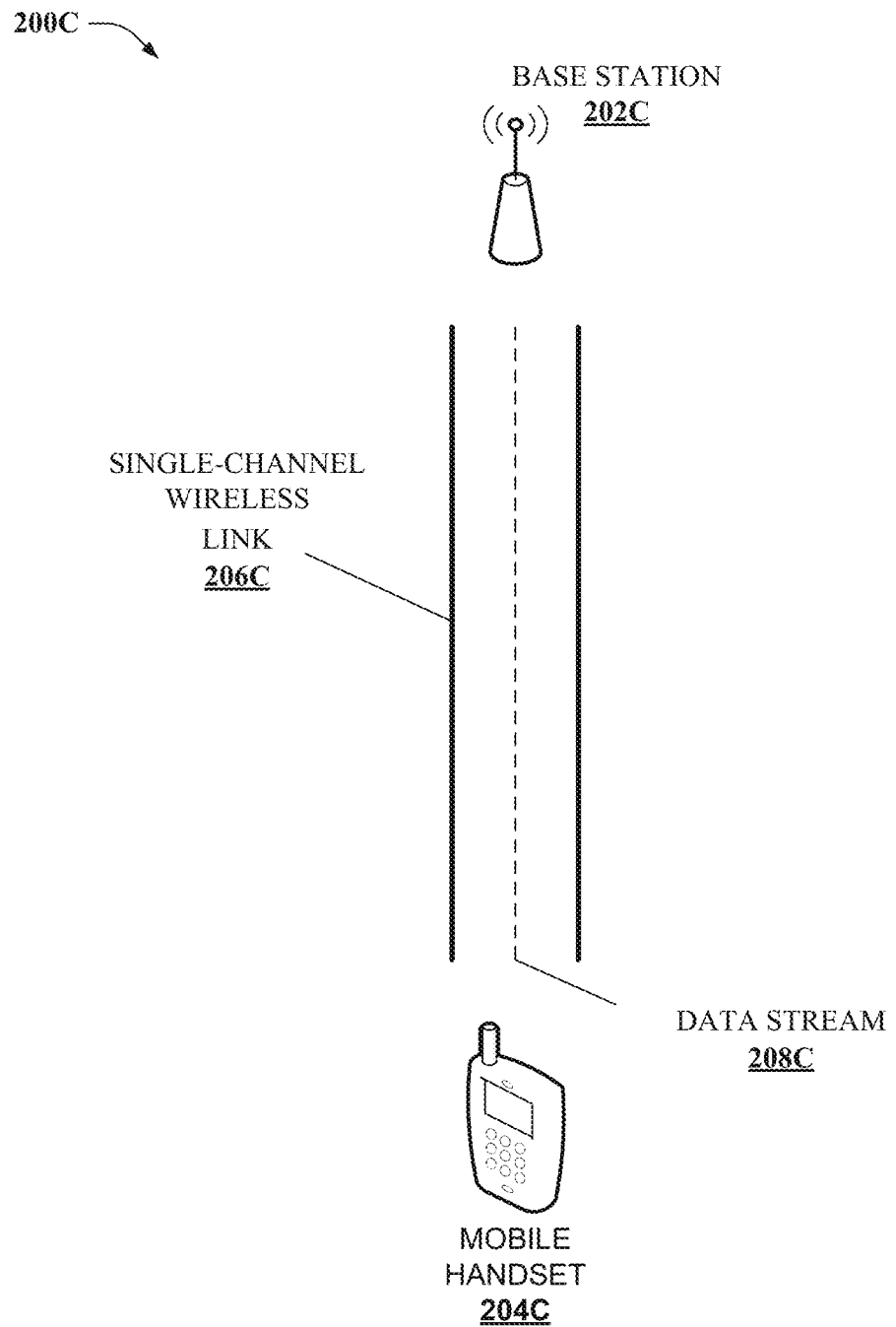
FIG. 2C depicts an example illustration of a transmit and/or receive diversity technique for a wireless link between a base station and a mobile handset.

FIGS. 2A, 2B and 2C provide depictions of example multi-transceiver communication architectures to provide context and clarification for aspects of the subject disclosure. FIG. 2A provides a sample depiction of a MIMO technique for a wireless link between a base station and a mobile handset. As defined herein, MIMO can include multiple input (e.g., multiple transmitter) multiple output (e.g., multiple receiver), as well as degenerate MIMO cases, including single input multiple output (SIMO) and multiple input single output (MISO) transmission (e.g., single transmitter multiple receiver, and multiple transmitter single receiver, respectively). In addition to the foregoing, MIMO can include various multi-transceiver transmission techniques known in the art such as beamforming (e.g., multi-layer beamforming or single-layer beamforming), spatial multiplexing, or diversity coding, or a suitable combination of these or like techniques.

Beamforming is a signal processing mechanism that can be implemented in conjunction with multiple transmitters and/or multiple receivers, which determines a direction of maximum signal strength of a received signal and/or increases sensitivity in such direction. In general, beamforming can involve directional transmission control and/or directional sensitivity reception to a radiation pattern (e.g., wireless link). For instance, one or more transmitters can emit a signal with differing power levels in differing directions. A receiver(s) can distinguish a direction(s) of maximum and/or increased signal strength (max direction) from a direction(s) of null or decreased signal strength. In addition, the receiver(s) can increase sensitivity in the max direction(s) and/or reduce sensitivity in directions of low or null signal strength or in a direction(s) where signal noise or interference is detected. As described, beamforming can provide gain for a signal transmitted in a particular direction as compared with omni-directional emission of a comparable signal at a comparable transmission power.

Spatial multiplexing is a multi-transceiver technique that can provide increased data rates in an environment of limited bandwidth by splitting a signal into multiple data streams on a substantially common bandwidth channel. A single data stream over a single orthogonal frequency division multiple access (OFDMA) or spatial division multiple access (SDMA) network channel is typically limited to a certain data rate. Some techniques for providing increased data rates involve allocating additional bandwidth (e.g., concatenating multiple channels or increasing channel bandwidth) to a call. In high population areas where many mobile calls are serviced concurrently by a serving mobile network, however, it can be impractical to provide increased data rates simply by allocating additional bandwidth to calls. In contrast, spatial multiplexing utilizes a common frequency channel, but splits a data stream into multiple streams (e.g., 208A, 210A, 212A) transmitted by multiple antennas on the channel. Accordingly, spatial multiplexing can provide increased channel capacity if a receiving device can decode and recombine the split data streams. As discussed above, multiple data streams transmitted over a substantially common frequency channel can be distinguished if sufficient multi-path scattering exists in a wireless link (206A). Thus, with sufficient multi-path scattering, as well as sufficient SNR, spatial multiplexing can provide significantly increased channel capacity and throughput.

Diversity coding typically involves transmission of a data stream over multiple channels concurrently. Diversity coding can require increased channel resources, but can provide higher quality transmission/reception if a wireless link (e.g., 306A) exhibits relatively low SNR. Diversity coding can transmit a signal over multiple channels concurrently resulting in diversity gain and increased throughput from use of multiple channel resources. Accordingly, if sufficient network resources are available, diversity coding can provide increased quality, gain and signal throughput in a mobile environment (200A).

FIG. 2A depicts a system 200A utilizing a spatial multiplexing MIMO technique to provide increased data rate and/or channel capacity for a single-channel wireless link 206A. The single-channel wireless link 206A provides data exchange between a base station 202A and a mobile handset 204A. The link 206A utilizes a particular frequency band (e.g., 20 kilohertz [kHz]) and a stream of data transmitted over such frequency band is limited to a particular data rate.

The single channel MIMO transmission mode depicted by system 200A can split a single signal into multiple signals. For instance, if the base station 202A and mobile handset 204A each have N transceivers, where N is an integer, the devices (202A, 204A) can split the signal (206A) into N separate data streams (206A, 208A, 210A). Each separate data stream (206A, 208A, 210A) can be transmitted at substantially a maximum data rate permitted by the single-channel wireless link 206A. Accordingly, spatial multiplexing can provide increased capacity for the single-channel wireless link 206A. Typically, a spatial multiplexing arrangement requires relatively high SNR and multi-path scattering in a wireless link (206A) so that separate data streams transmitted over a substantially common frequency channel can be decoded at a receiving device (202A, 204A).

FIG. 2B illustrates a sample depiction of a mechanism to increase throughput of a wireless link (206B) by multi-channel concatenation. Concatenation involves separating a data signal (206B) onto two or more separate frequency channels 208B, 212B. As an example for illustrative purposes, a base station 202B can split a single data stream (206B) into multiple data streams 210B, 214B transmitted by separate antennas on separate frequency channels 208B, 212B. A mobile handset 204B can receive the multiple data streams at one or more receivers and recombine the streams into a single data stream.

Typically, concatenation utilizes a like number of antennas at an emitter (202B) and a receiver (204B). However, if the emitter and/or receiver have sufficient processing capability, a single transceiver can be utilized to split the data stream and broadcast/receive multiple streams 210B, 214B over multiple frequency channels 208B, 212B. For instance, if two wireless channels 208B, 212B each operate at a 20 kHz channel bandwidth, a transmit or receive signal processor at the base station 202B and/or mobile handset 204B (not depicted) operating at substantially 40 kHz can split a data stream into two separate streams 210B, 214B. The split streams 210B, 214B can then be transmitted on the two wireless channels 208B, 212B of a multi-channel wireless link 206B. Likewise, a single antenna operating at substantially 40 kHz at the mobile handset 204B can receive, process and recombine the data streams 210B, 214B, or two antennae operating at substantially 20 kHz could each receive one stream (210B, 214B) on one channel (208B, 212B) and provide the separate streams to a signal processor (not depicted).

According to some embodiments of the subject disclosure, multiple antennas at the mobile handset 204B can each receive multiple signals transmitted over multiple channels. Such an arrangement can provide channel diversity in conjunction with multi-channel concatenation. For example, two antennas at the mobile device 204B operating at substantially 40 kHz each could receive two data streams (210B, 214B) transmitted over two 20 kHz channels (208B, 212B) concurrently. According to diversity principles, receiving multiple copies of a data stream can provide enhanced quality reception as well as diversity channel gain. Accordingly, if a base station 202B and/or mobile handset 204B have sufficient signal processing capability, and a multi-channel wireless link has suitable SNR, multi-channel concatenation can be utilized in conjunction with transmit/receive diversity. Such an arrangement can provide increased data rates for a wireless link (206B) as well as improve channel quality and provide diversity gain.

FIG. 2C depicts an example illustration of a transmit and/or receive diversity technique for a wireless link (206C) between a base station 202C and a mobile handset 204C. The diversity technique depicted by system 200C involves a single-channel wireless link 206C, although similar techniques can be utilized in conjunction with multiple data streams and/or multi-channel wireless links if suitable signal processing capability is available at a transmitter (202C, 204C) and/or receiver (202C, 204C). Base station 202C transmits and receives a single data stream 208C over a single-channel wireless link 206C. Likewise, mobile handset also transmits and receives the single data stream 208C over the single-channel wireless link 206C. However, each device (202C, 204C) can transmit the data stream 208C multiple times on the link (206C). For instance, if the base station 202C has two transmitters, substantially like copies of the data stream 208C can be transmitted across the link (206C) and received by an antenna at the mobile handset 204C. Multiple transmissions can provide redundancy in the data stream 208C. Accordingly, if data is lost on a first of the transmissions (208C), the mobile handset 204C can cross-reference an additional transmission (208C) and attempt to recover the lost data.

According to additional embodiments, system 200C can a receive diversity arrangement. According to receive diversity, the mobile handset 204C utilizes multiple receivers to each receive a copy of a data stream 208C sent by an emitting device (202C). The receivers can utilize different receive paths, signal processing techniques, and so on, to receive the data stream 208C. If one receiver is unable to decode a portion of the data stream 208C, another receiver can be cross-referenced to recover such portion. Thus, by utilizing multiple receivers in conjunction with a single data stream 208C, system 200C can provide increased SNR and reduced BER for a single-channel wireless link 206C. It should be appreciated that the foregoing can also be applicable to transmit diversity implemented by an emitter (202C) in conjunction with receive diversity implemented by a receiver (204C). Multiple like copies of a data stream (208C) can be transmitted and each received by multiple receivers. Such a technique can introduce further redundancy to the single-channel wireless link beyond that provided by transmit diversity or receive diversity alone. Transmit and receive diversity could be useful, for instance, if a SNR of the link 206C is unusually low and significant error results in data transmitted between devices (202C, 204C).

Figure 3:
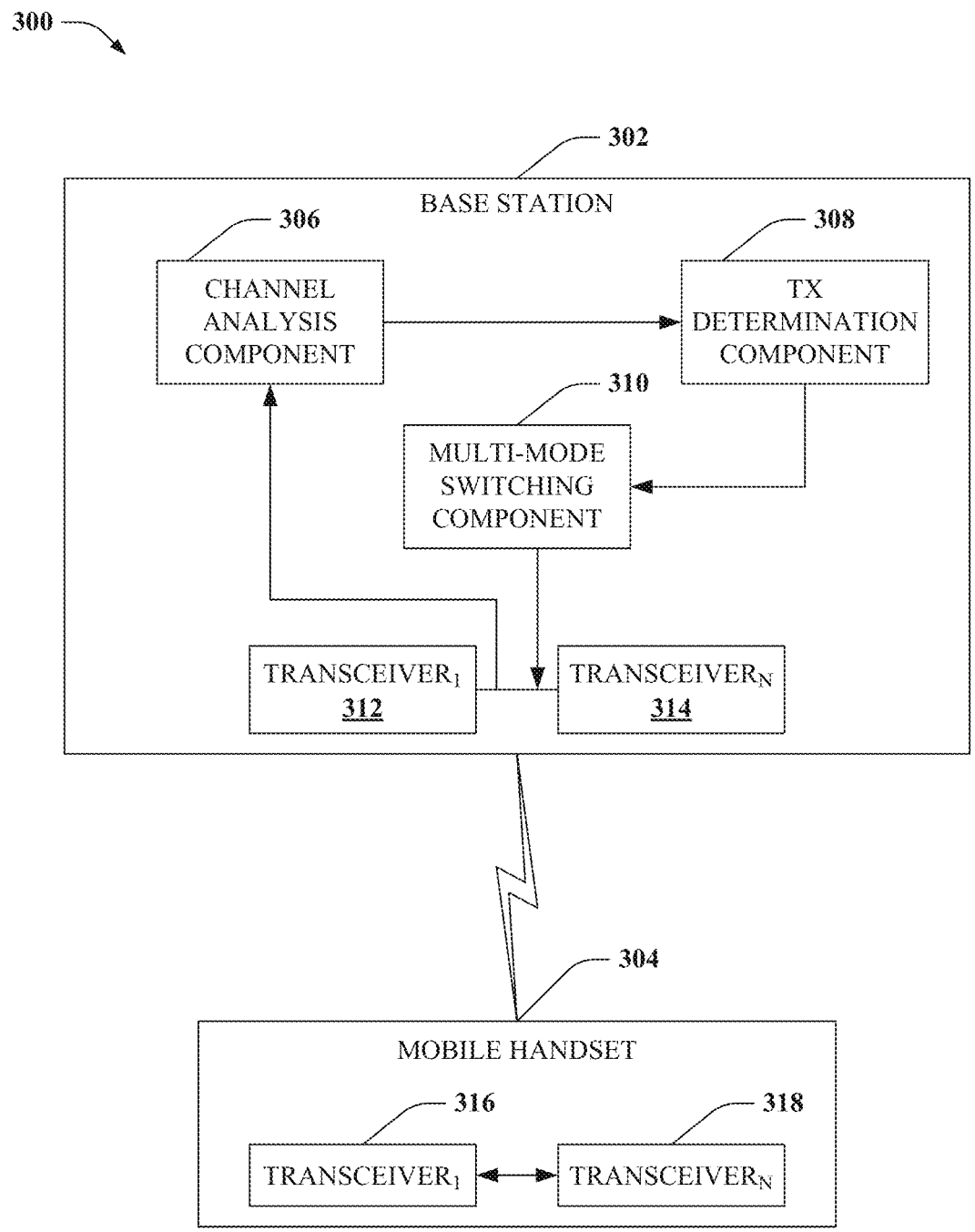
FIG. 3 illustrates a block diagram of a sample system that provides switching between multi-transceiver communication techniques for a wireless link.

FIG. 3 illustrates a block diagram of a sample system 300 that can switch between multi-transceiver communication techniques in a wireless environment. System 300 can include a base station 302 and a mobile handset 304 coupled by a wireless communication link. The base station and/or the mobile handset can have one or more transceivers 312, 314 and/or 316, 318 respectively. System 300 can utilize a channel characteristic of the wireless communication link between the base station 302 and handset 304, as well as a number of available transceivers and/or signal processing capabilities of the devices (302, 304), to select between multiple multi-transceiver communication techniques for communication over the wireless link. Accordingly, an increased data rate and/or channel quality can be provided depending on conditions associated with the link or devices (302, 304).

System 300 can include a channel analysis component 306 can that obtain a channel characteristic of the wireless link. The characteristic can be determined at the mobile handset 304 and transmitted to the base station 302 (or, e.g., one or more additional mobile handsets—not depicted), determined at the base station 302, or a combination thereof. The channel characteristic can include a SNR, BER, multi-path scattering factor, high bandwidth availability, or a combination of these or like characteristics that can impact wireless link throughput, quality, or multi-channel/multi-data stream operability.

In addition, system 300 can include a determination component 308 that receives and compares a channel characteristic(s) to a predetermined threshold (e.g., a predetermined SNR level, a predetermined multi-path scattering level, predetermined processing resource level, and so on). Based on the comparison, the determination component 308 can identify an optimal (e.g., higher quality and/or higher data rate) multi-transceiver communication technique for the wireless link. For instance, a high SNR and high multi-path scattering level can provide optimal results from a multi-stream single channel technique (e.g., spatial multiplexing MIMO). Alternatively, a mid-level SNR and/or relatively high channel availability can result in increased data rate utilizing a multi-channel concatenation technique. Further, a relatively low SNR can be improved utilizing a diversity transmit/receive technique. In addition to the foregoing, combinations of such techniques, such as transmit/receive diversity in conjunction with spatial multiplexing or multi-channel concatenation, could be determined optimal based on the channel characteristic(s).

In accordance with some aspects, determination component 308 can reject employing the multiple signals on either the single channel or the multiple channels and select a diversity receive mode based on the channel characteristic(s). For instance, if a SNR is below a quality threshold, MIMO and concatenation type multi-receiver transmission may be ineffective. Accordingly, increased quality provided by receive and/or transmit diversity techniques can be a more optimal choice for the wireless link.

According to further aspects, system 300 can include a multi-mode switching component 310 that can communicate a multi-transceiver communication technique to a mobile handset 304. For instance, the multi-mode switching component 310 can instruct the mobile handset 304 to interface at least two of a plurality of handset transceivers (316, 318) with two or more data streams of a single channel if a channel characteristic(s) meets a single channel threshold (e.g., a minimum SNR or multi-path scattering level). In addition, the multi-mode switching component 310 can instruct the mobile handset 304 to synchronize the at least two of the plurality of handset transceivers (316, 318) to concatenate multiple wireless channels if the channel characteristic(s) meets a multi-channel threshold (e.g., mid to high SNR and/or sufficient bandwidth availability).

As a particular example, channel analysis component 306 can obtain a channel characteristic indicating that the wireless link between the base station 302 and the mobile handset 304 has high SNR but low multi-patch scattering. Based on this information, determination component 308 can select employing multiple signals on multiple channels of the wireless link to provide increased throughput for wireless data exchange. Accordingly, multi-mode switching component 310 can instruct the mobile handset to synchronize transceiver$_1$ 316 with a first wireless channel and a second transceiver (e.g., transceiver$_N$ 318) to a second wireless channel and concatenate signals received over the channels. According to this multi-transceiver technique, the two wireless channels will be transmitted over substantially different frequency bands.

According to another particular example, channel analysis component 306 can obtain a channel characteristic indicating that the wireless link has high SNR and high multi-path scattering. Based on such information, determination component 308 can select a multi-data stream, single channel transmission technique (e.g., MIMO) to provide increased data rates for the wireless link utilizing the high multi-path scattering to distinguish the multiple data streams over the single channel. Thus, multi-mode switching component 310 can instruct the mobile handset to interface two or more transceivers (316, 318) with two or more separate streams of data on a substantially common frequency band. By transmitting and receiving the multiple streams each at substantially a maximum data rate for the frequency band, an increased data rate can be obtained as compared with a single data stream transmitted over the frequency band.

According to still other examples, channel analysis component 306 can obtain a channel characteristic indicating a relatively low SNR in the wireless link. Accordingly, determination component 308 can select a transmit/receive diversity mode to provide increased quality. In such case, multi-mode switching component 310 can also instruct the mobile handset 304 to synchronize the at least two of the plurality of handset transceivers 316, 318 to each receive a single data stream to reduce error rates in transmitted data. Accordingly, multi-mode switching component 310 can provide an interface that enables synchronized switching from one multi-transceiver architecture to another based on a characteristic of a wireless link between the mobile handset 304 and base station 302.

Figure 4:
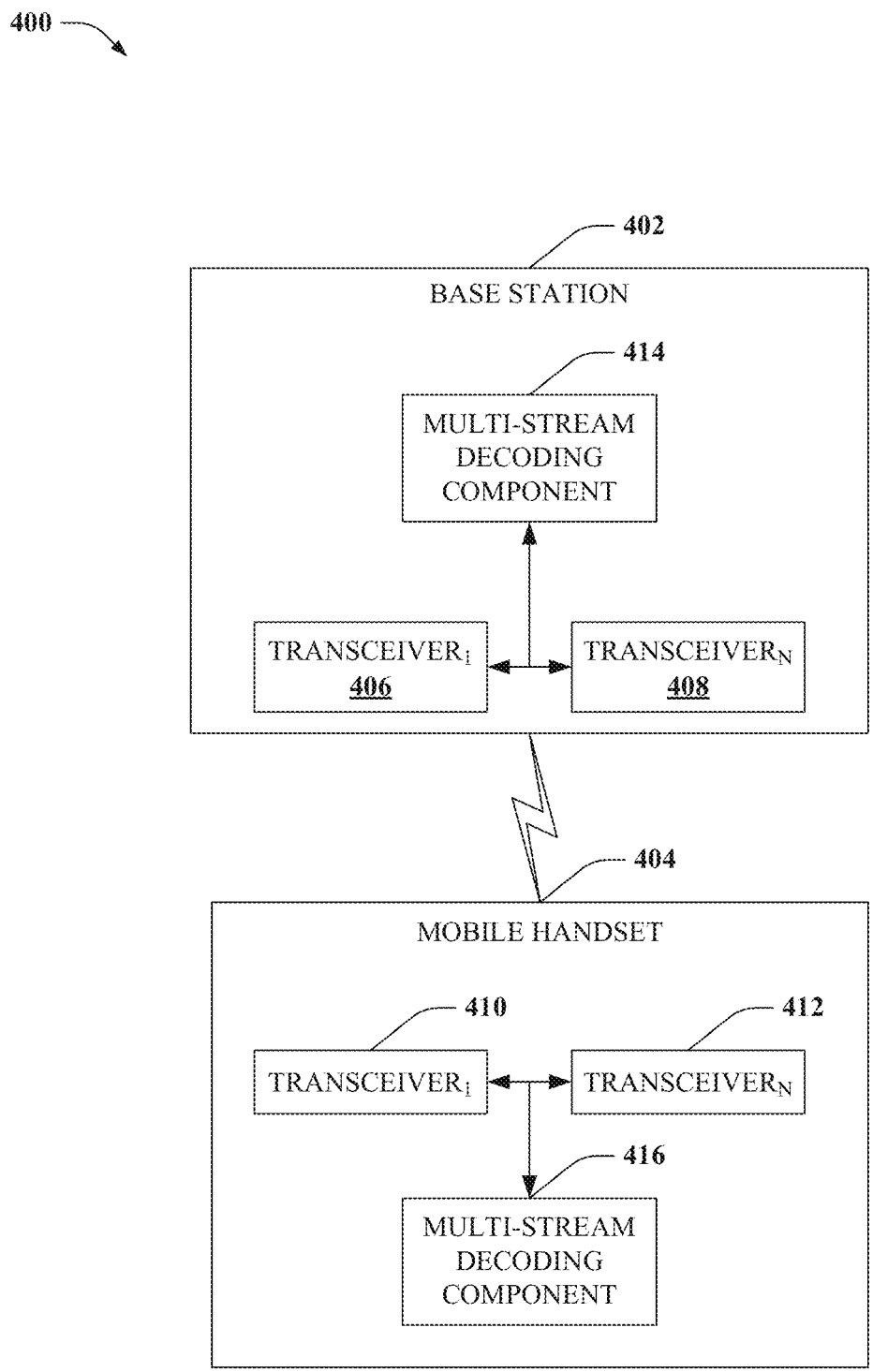
FIG. 4 depicts a block diagram of an example system that provides decoding and encoding of multi-data stream transmission according to some aspects.

FIG. 4 depicts a block diagram of an example system 400 that provides decoding and encoding of multi-data stream transmission according to some aspects. System 400 can include a base station 402 and mobile handset 404 each having multiple transceivers (406, 408, 410, 412) to facilitate multi-transceiver wireless communication. For instance, concatenation of multiple wireless channels, with or without diversity transmission/reception, can be implemented. System 400 can also implement various MIMO techniques (e.g., beamforming, spatial multiplexing, code diversity, etc.) as an alternative to concatenation and/or transmit/receive diversity. Specifically, selection of a suitable multi-transceiver technique can be based on concurrent channel characteristics associated with a wireless link between the base station 402 and mobile handset 404. Accordingly, an optimal technique can be utilized to provide increased data rate or channel quality for various conditions.

In addition to the foregoing, multi-stream transmission can be transmitted, received, processed and combined at the base station 402 and mobile handset 404. A multi-stream decoding component 414, 416 at the base station 402 and mobile handset 404, respectively, can combine two or more signals received at the base station 402 or handset 404. For instance, in a spatial multiplexing environment, the multi-stream decoding components 414, 416 can combine a first signal received over a first data stream (e.g., by transceiver$_1$ 406, 410) with a second signal received over a second data stream (e.g., by transceiver$_N$ 408, 412). The resulting signal can include substantially twice as much data as could be carried by a single data stream.

As another example, in a multi-channel concatenation environment, multi-stream decoding components 414, 416 can combine a first signal received over a first channel with a second signal received over a second, separate channel to form a combined communication. By utilizing two channels concurrently, substantially twice as much throughput, or data rate, can be achieved for a wireless communication. As long as sufficient channel resources and sufficient SNR are available for the communication, multi-channel concatenation can be an attractive mechanism.

Moreover, multi-stream decoding components 414, 416 can include advanced signal processing techniques to enable reception of multiple data streams by each transceiver (406, 408, 410, 412). For instance, two transceivers (410, 412) of the mobile handset 404 can be directed to each receive two separate data streams transmitted over a common 20 kHz frequency channel via spatial multiplexing. The multi-stream decoding component 416 could operate at 40 kHz (or, e.g., multiples of a number of separate streams received at each of multiple channels) to process and recombine the two signals received by the first antenna (410) and the two signals received by the second antenna (412). Accordingly, a spatially multiplexed signal on a substantially common 20 kHz frequency channel could be received with diversity to improve reception of multiple data streams. Alternatively, two transceivers (410, 412) of the mobile handset 404 can be directed to each receive two separate data streams transmitted over two separate frequency channels. In a similar manner, multi-stream decoding components 414, 416 can process and recombine the two data streams at each receiver (e.g., by operating at substantially 40 kHz for 20 kHz channels), facilitating diversity reception for multi-channel concatenation.

Figure 5:
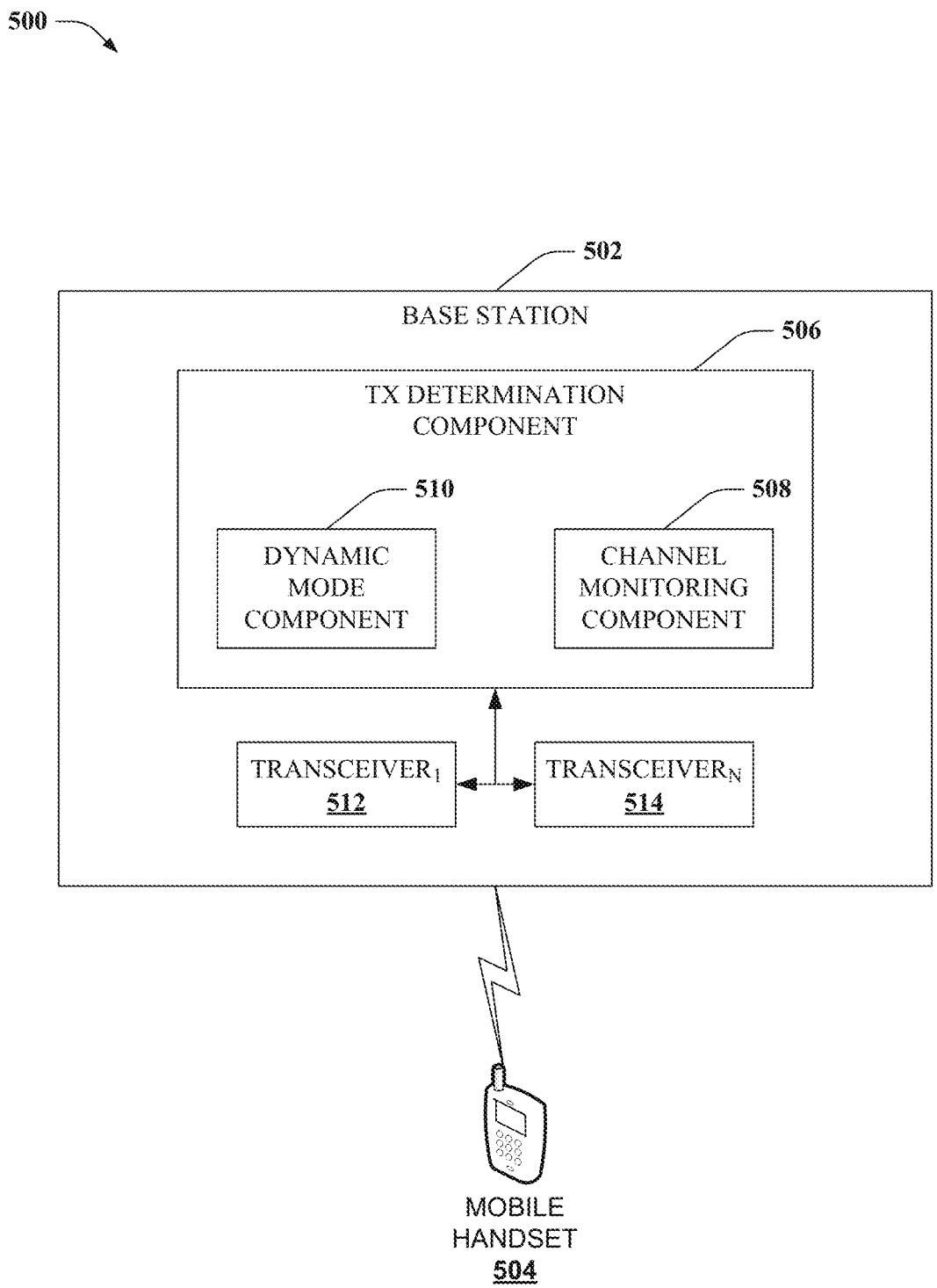
FIG. 5 illustrates a block diagram of an example system that periodically monitors a wireless link to dynamically switch between multi-transceiver techniques.

FIG. 5 illustrates a block diagram of an example system 500 that periodically monitors a wireless link to dynamically switch between multi-transceiver techniques. System 500 includes a base station 502 and a mobile handset coupled by a wireless link. The base station 502 includes two or more transceivers, transceiver$_1$ 512 through transceiver$_N$ 514; the mobile handset 504 can include one or more transceivers (not depicted). As described herein, a determination component 506 can obtain a channel characteristic and select between various multi-transceiver techniques to increase data rate and/or quality for the wireless link.

According to some embodiments, the determination component 506 further includes a channel monitoring component 508 that determines a concurrent value of a channel characteristic of the wireless link (e.g., SNR, BER, multi-path scattering factor, directional gain/loss, CQI, bandwidth availability, device signal processing capability, and so on). For instance, the channel monitoring component 508 can periodically measure and/or receive an indication of the channel characteristic. Such periodic indication can be helpful to provide a dynamic mapping of characteristics associated with the wireless link.

Based on the concurrent channel characteristics, a dynamic mode component 510 can periodically compare a concurrent value of the channel characteristic(s) with a predetermined threshold pertaining to one or more multi-transceiver transmission techniques. For instance, a threshold SNR and/or multi-path scattering level can be compared to determine compatibility or gain resulting from spatial multiplexing. Alternatively, or in addition, the concurrent channel characteristics can be compared with a threshold SNR and bandwidth availability to determine compatibility or gain resulting from multi-channel concatenation. Further, a minimum quality threshold can be compared to the channel characteristic to determine whether diversity transmission or reception would be beneficial to provide increased quality and reduced BER. Thus, by periodically comparing concurrent channel characteristics with such thresholds, the determination component 506 can dynamically select a suitable multi-transceiver technique suited to the wireless link. Accordingly, system 500 can achieve a substantial improvement over conventional techniques that enable only a single type of multi-transceiver technique for a particular mobile handset 504 or particular base station 502.

Figure 6:
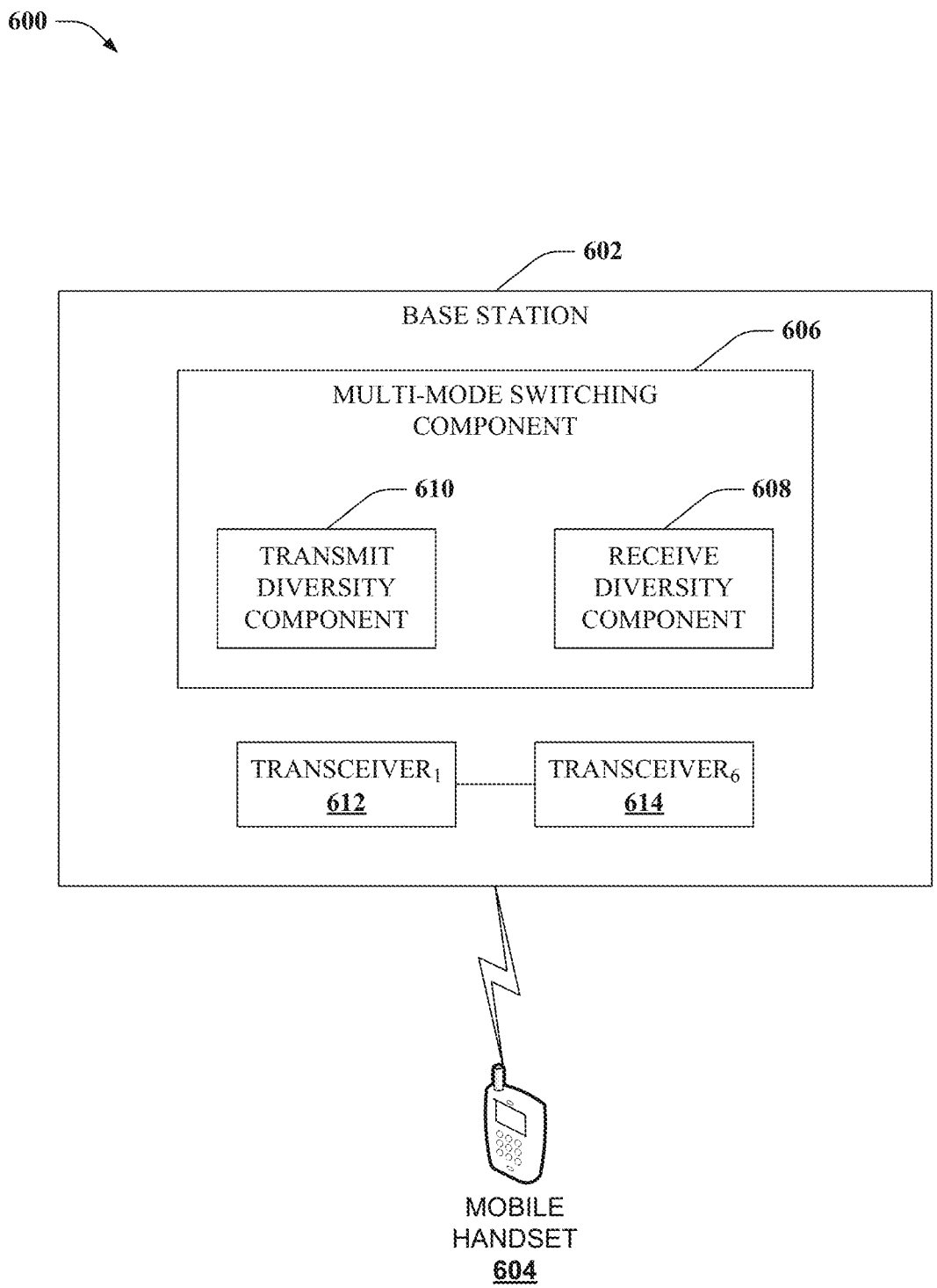
FIG. 6 depicts a block diagram of a sample system that provides combined diversity and multi-channel concatenation for a wireless link.

FIG. 6 depicts a block diagram of a sample system 600 that provides combined diversity and multi-channel concatenation for a wireless link. System 600 includes a base station 602 and mobile handset 604 communicatively coupled by a wireless link. The base station 602 and/or mobile handset 604 can include multiple transceivers (612, 614). In addition, the base station 602 can select a multi-transceiver communication technique for the wireless link based at least in part on a concurrent channel characteristic of the wireless link, as described herein.

System 600 can include a multi-mode switching component 606 that can instruct the mobile handset 604 to synchronize one or more transceivers (not depicted) of the mobile station 604 to a multi-transceiver communication technique selected by the base station 602. As an example, multi-mode switching component 606 can instruct the mobile handset 604 to synchronize two handset transceivers to receive two data streams transmitted via two independent frequency bands and concatenate the data streams into a combined signal.

Multi-mode switching component 606 can include a transmit diversity component 608 that instructs the mobile handset to further synchronize two or more handset transceivers to utilize a transmit diversity arrangement for two or more data streams transmitted on two or more wireless channels. Accordingly, the two or more transceivers can be synchronized to split a signal into two or more data streams. The data streams can each be transmitted concurrently on a separate channel by a separate handset transceiver.

Multi-mode switching component 606 can also include a receive diversity component 610 that instructs the mobile handset 604 to further synchronize at least two handset transceivers to receive each of multiple data streams transmitted on multiple channels of a substantially common frequency band. For instance, a sampling rate of a signal processor can be set to a frequency of the two or more wireless channels multiplied by the number of data streams received (e.g., 40 kHz for two data streams transmitted via two 20 khz channels, 60 kHz for three data streams transmitted via three 20 kHz channels, and so on). Accordingly, system 600 provides a mechanism for integrating transmit and/or receive diversity techniques in conjunction with multi-channel concatenation. Such an arrangement can provide increased data rates as well as higher quality reception, if wireless channel and network bandwidth resources are sufficient.

The aforementioned systems have been described with respect to interaction between several components, modules and/or mobile network functions. It should be appreciated that such systems and components/modules/functions can include those components or sub-components specified therein, some of the specified components or sub-components, and/or additional components. For example, a system could include channel analysis component 106, determination component 108, and multi-stream decoding component 414, or a different combination of these and other components. Sub-components could also be implemented as components communicatively coupled to other components rather than included within parent components. Additionally, it should be noted that one or more components could be combined into a single component providing aggregate functionality. For instance, transmit diversity component 608 can include receive diversity component 610, or vice versa, to facilitate instructing a mobile handset to utilize either transmit or receive diversity, or both, by way of a single component. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 7-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, media, or a carrier in conjunction with such computer-readable device or media.

Figure 7:
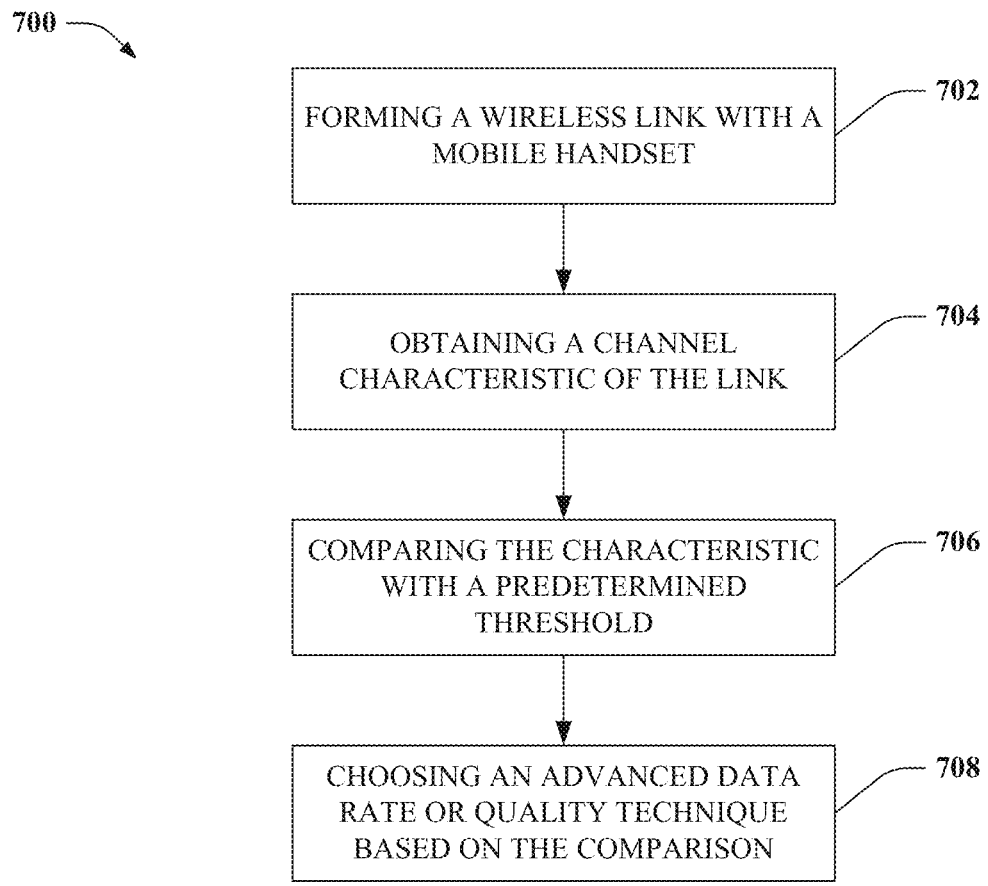
FIG. 7 illustrates a flowchart of a sample methodology for providing alternative multi-transceiver communication techniques for a wireless link.

FIG. 7 illustrates a flowchart of a sample methodology 700 for providing alternative multi-transceiver communication techniques for a wireless link based on characteristics of the wireless link or wireless network. At 702, method 700 can form a wireless data link with a mobile handset. The wireless link can utilize a radio frequency channel, such as a licensed cellular frequency or a public WiFi frequency, a microwave frequency or the like. In addition, the wireless link can include one or more frequency bands, and can carry circuit-switched information or packet-switched information, or both. The wireless handset can be a cellular phone, mobile phone, dual-mode device, multi-mode device, laptop, PDA, or a combination thereof or of the like.

At 704, method 700 can obtain a channel characteristic of the wireless data link and compare the channel characteristic with a predetermined threshold. The channel characteristic of the wireless data link can include SNR, BER, CQI, bandwidth availability, multi-path scattering, or a combination thereof or a like characteristic that can affect operability or performance of a multi-transceiver communication technique. In addition, the predetermined threshold can be a level of a channel characteristic pertinent to operability, compatibility or effectiveness of one or more multi-transceiver communication techniques. For instance, a minimum SNR and/or multi-path scattering factor can be associated with a first threshold pertinent to MIMO communication. As another example, a second minimum SNR level and/or a channel bandwidth availability can be associated with a second threshold pertinent to multi-channel concatenation. As a further example, a suitable SNR level can be associated with transmit or receive diversity techniques.

At 706, method 700 can select a multi-transceiver communication technique based at least in part on a result of comparing the channel characteristic with the predetermined threshold. Such technique can include a MIMO communication (e.g., spatial multiplexing), multi-channel concatenation, and/or transmit/receive diversity. Accordingly, method 700 provides a process for selecting a suitable multi-transceiver communication technique pertinent to capabilities of a mobile network or prevailing channel conditions with a mobile handset.

Figure 8:
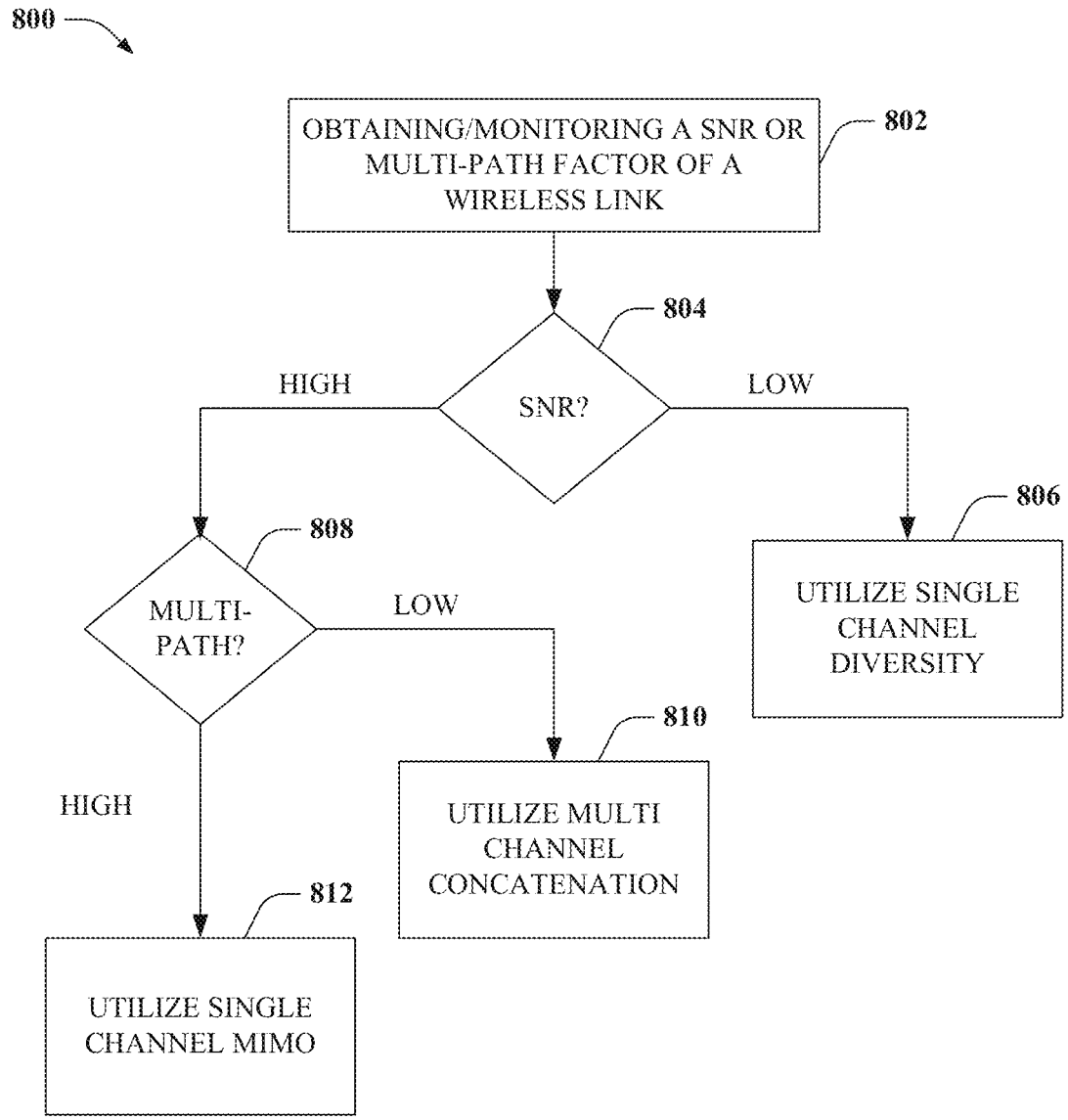
FIG. 8 depicts a flowchart of an example methodology for determining between multi-transceiver techniques based on channel scattering and signal/noise ratio.

FIG. 8 depicts a flowchart of an example methodology 800 for determining between multi-transceiver techniques based on channel scattering and signal/noise ratio. At 802, a SNR or multi-path scattering factor of a wireless network link can be obtained. For instance, such data can be determined by a mobile handset and transmitted to a network base station. Alternatively, or in addition, a component of the network base station, base station controller, etc., can receive and/or determine the SNR or multi-patch scattering factor. At 804, a determination can be made as to whether an obtained SNR is above or below a quality threshold. If the SNR is below the quality threshold, method 800 can proceed to 806 where a transmit and/or receive diversity arrangement can be selected for the wireless network link.

If the determination at 804 results in a SNR higher than the quality threshold, method 800 can proceed to 808 where a second determination as made as to whether a multi-path scattering factor is above a scattering threshold. If the scattering factor is below the scattering factor, method 800 can proceed to 810 where multi-channel concatenation is selected for the wireless network link. If the scattering factor is above the scattering threshold, method 800 can proceed to 812 where a spatial multiplexing MIMO arrangement is selected for the wireless network link. As described, method 800 provides for determining an appropriate multi-transceiver communication technique for wireless communication based on capabilities of a network link.

Figure 9:
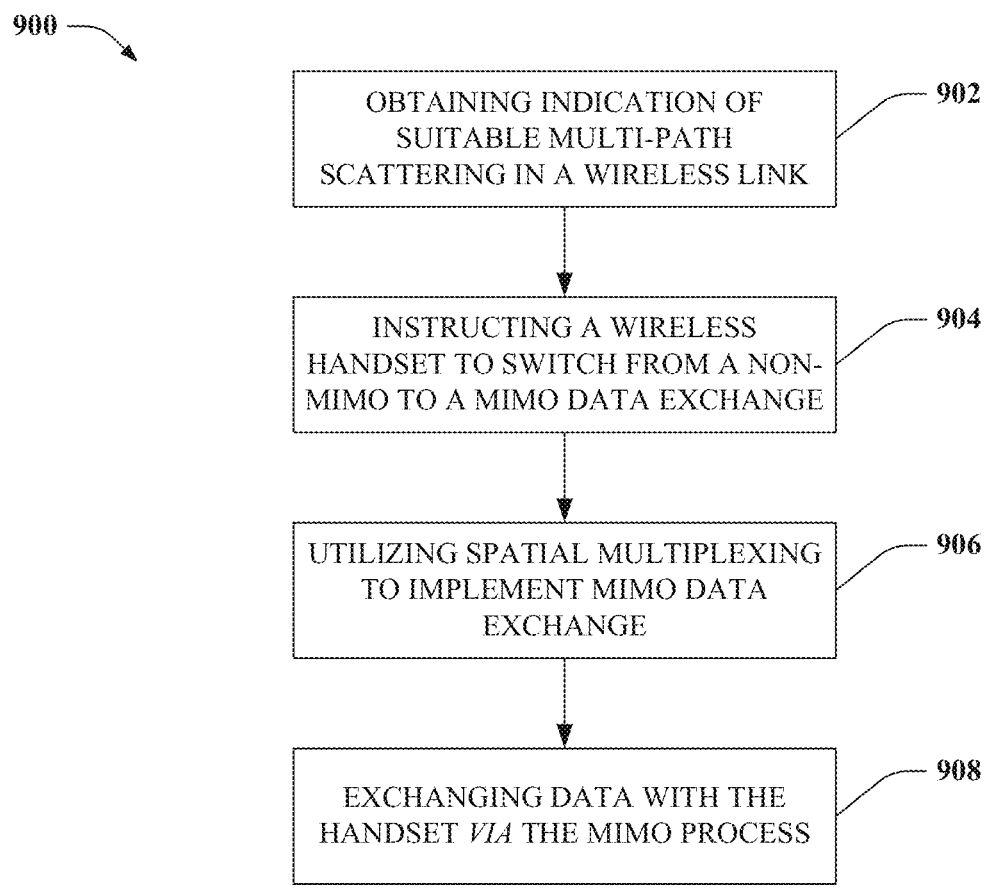
FIG. 9 illustrates a flowchart of a sample methodology for selecting a MIMO communication technique based on characteristics of a wireless link.

FIG. 9 illustrates a flowchart of a sample methodology 900 for selecting a MIMO communication technique based on characteristics of a wireless link. At 902, method 900 can obtain indication of a multi-path scattering factor in a wireless link suitable to implement MIMO transmission. At 904, method 900 can instruct a wireless handset to switch from a non-MIMO to a MIMO transmission. At 906, method 900 can instruct the mobile handset to utilize spatial multiplexing for the MIMO transmission. Alternatively, the mobile handset can be instructed to utilize beamforming or code diversity, or a suitable other MIMO transmission technique. At 908, method 900 can exchange data with the mobile handset by way of the MIMO transmission. Accordingly, method 900 provides for switching between a non-MIMO and a MIMO transmission architecture based on obtaining indication of suitable multi-path scattering in a wireless link with the mobile handset.

Figure 10:
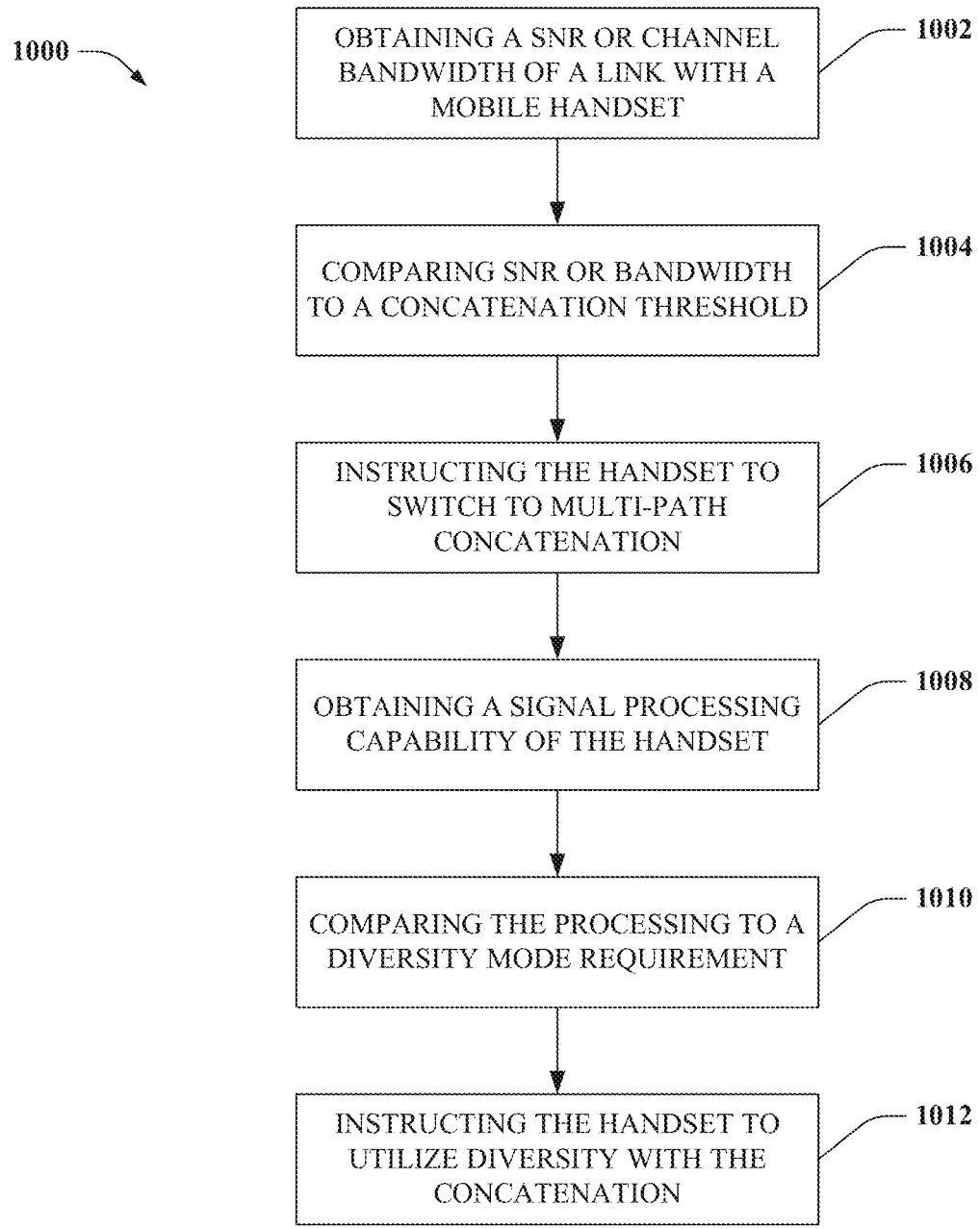
FIG. 10 illustrates a flowchart of a sample methodology for selecting a multi-channel concatenation technique based on characteristics of a wireless link.

FIG. 10 illustrates a flowchart of a sample methodology 1000 for selecting a multi-channel concatenation technique based on characteristics of a wireless link. At 1002, method 1000 can obtain an SNR, or an available bandwidth parameter, or both, of a wireless link between a base station and a mobile handset. At 1004, method 1000 can compare the SNR and/or available bandwidth parameter to a concatenation threshold requirement. At 1006, if the SNR and/or bandwidth meet the concatenation threshold requirement, method 1000 can instruct the mobile handset to switch to multi-path concatenation communication. At 1008, a signal processing capability of the handset can be obtained. The signal processing capability can include a data sampling rate, processing frequency, or a like parameter pertinent to concurrent multi-channel or multi-path processing.

At 1010, the signal processing capability can be compared to a diversity mode requirement. The diversity mode requirement can be related to processing capability needed for processing two or more data streams received over two or more channels by each of multiple antennas concurrently. For instance, a multi-path signal is sent to the mobile handset via two data streams on one of two separate channels. The handset has a dual-receiver arrangement, enabling both channels to be received concurrently. If processing and sampling capabilities at the mobile handset are sufficient (e.g., substantially twice a sampling frequency of the two data streams or greater), each antenna can receive both of the data streams concurrently. Thus, at 1012, if the signal processing capability is suitable to meet the diversity mode requirement, method 1000 can instruct the mobile handset to utilize diversity reception and/or transmission in conjunction with multi-path concatenation. Accordingly, method 1000 can provide increased data rate by switching to a multi-path concatenation arrangement, and provide increased signal reception/transmission quality by implementing a channel diversity technique in conjunction with the concatenation.

Figure 11:
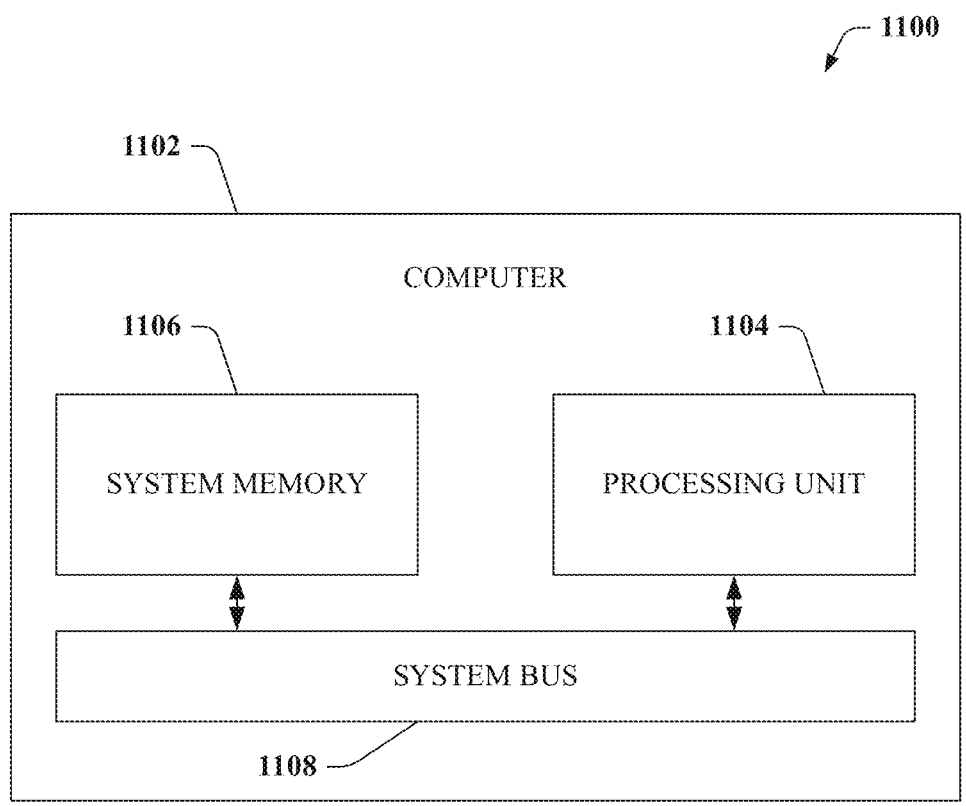
FIG. 11 illustrates a block diagram of a sample operating environment for processing data in a wireless environment according to aspects disclosed herein.

Referring now to FIG. 11, there is illustrated a block diagram of a computer 1102 operable to provide networking and communication capabilities between a wired or wireless communication network and a server and/or communication device. In order to provide additional context for various aspects of the claimed subject matter, FIG. 11 and the following discussion are intended to provide a brief, general description of a suitable computing environment 1100 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer (1102) typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Suitable combinations of the any of the above should also be included within the scope of communication media derived from computer-readable media and capable of subsequently propagating through electrically conductive media, (e.g., such as a system bus, microprocessor, data port, and the like) and/or non-electrically conductive media (e.g., in the form of radio frequency, microwave frequency, optical frequency and similar electromagnetic frequency modulated data signals).

With reference again to FIG. 11, the exemplary environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors, such as a single core processor, a multi-core processor, or any other suitable arrangement of processors. The system bus 1108 can be any of several types of bus structure that can further interconnect to a memory bus (with or without a memory controller), a peripheral bus, and a local bus using any of a variety of commercially available bus architectures. The system memory 1106 can include read-only memory (ROM), random access memory (RAM), high-speed RAM (such as static RAM), EPROM, EEPROM, and/or the like. Additionally or alternatively, the computer 1102 can include a hard disk drive, upon which program instructions, data, and the like can be retained. Moreover, removable data storage can be associated with the computer 1102. Hard disk drives, removable media, etc. can be communicatively coupled to the processing unit 1104 by way of the system bus 1108.

The system memory 1106 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 1102 through one or more wired/wireless input devices, such as a keyboard, pointing and clicking mechanism, pressure sensitive screen, microphone, joystick, stylus pen, etc. A monitor or other type of interface can also be connected to the system bus 1108.

The computer 1102 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 1102 can connect to other devices/networks by way of antenna, port, network interface adaptor, wireless access point, modem, and/or the like.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out, anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
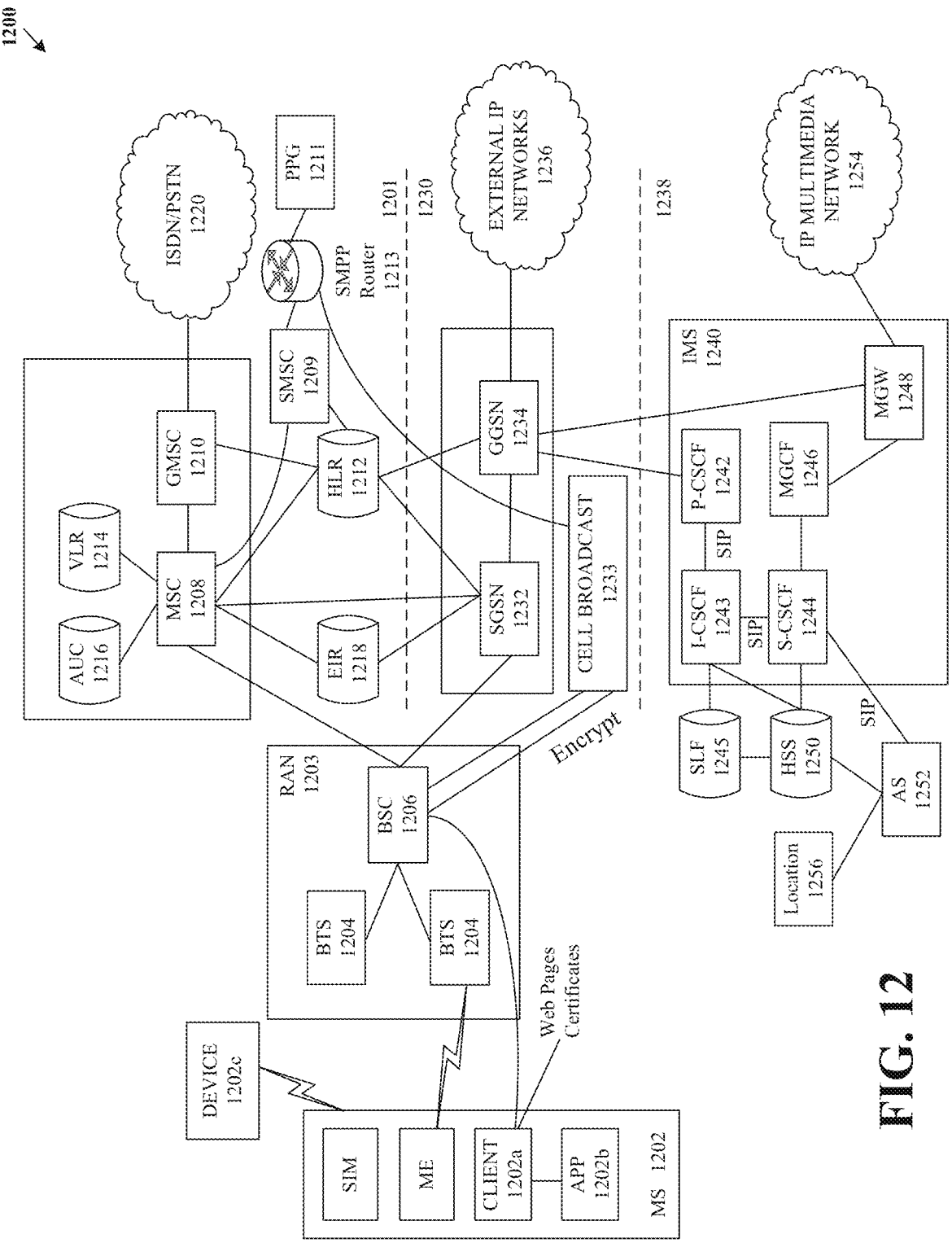
FIG. 12 depicts a block diagram of a sample networking environment suitable to provide a wireless link between a base station and a mobile handset.

Now turning to FIG. 12, such figure depicts a GSM/GPRS/IP multimedia network architecture 1200 that includes a GSM core network 1201, a GPRS network 1230 and an IP multimedia network 1238. The GSM core network 1201 includes a Mobile Station (MS) 1202, at least one Base Transceiver Station (BTS) 1204 and a Base Station Controller (BSC) 1206. The MS 1202 is physical equipment or Mobile Equipment (ME), such as a mobile phone or a laptop computer that is used by mobile subscribers, with a Subscriber Identity Module (SIM). The SIM includes an International Mobile Subscriber Identity (IMSI), which is a unique identifier of a subscriber. The MS 1202 includes an embedded client 1202a that receives and processes messages received by the MS 1202. The embedded client 1202a can be implemented in JAVA and is discuss more fully below.

The embedded client 1202a communicates with an application 1202b that provides services and/or information to an end user. One example of the application can be navigation software that provides near real-time traffic information that is received via the embedded client 1202a to the end user. The navigation software can provide road conditions, suggest alternate routes, etc. based on the location of the MS 1202. Those of ordinary skill in the art understand that there are many different methods and systems of locating an MS 1202.

Alternatively, the MS 1202 and a device 1202c can be enabled to communicate via a short-range wireless communication link, such as BLUETOOTH. For example, a BLUETOOTH SIM Access Profile can be provided in an automobile (e.g., device 1202c) that communicates with the SIM in the MS 1202 to enable the automobile's communications system to pull information from the MS 1202. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 1202c. There can be an endless number of devices 1202c that use the SIM within the MS 1202 to provide services, information, data, audio, video, etc. to end users.

The BTS 1204 is physical equipment, such as a radio tower, that enables a radio interface to communicate with the MS. Each BTS can serve more than one MS. The BSC 1206 manages radio resources, including the BTS. The BSC can be connected to several BTSs. The BSC and BTS components, in combination, are generally referred to as a base station (BSS) or radio access network (RAN) 1203.

The GSM core network 1201 also includes a Mobile Switching Center (MSC) 1208, a Gateway Mobile Switching Center (GMSC) 1210, a Home Location Register (HLR) 1212, Visitor Location Register (VLR) 1214, an Authentication Center (AuC) 1218, and an Equipment Identity Register (EIR) 1216. The MSC 1208 performs a switching function for the network. The MSC also performs other functions, such as registration, authentication, location updating, handovers, and call routing. The GMSC 1210 provides a gateway between the GSM network and other networks, such as an Integrated Services Digital Network (ISDN) or Public Switched Telephone Networks (PSTNs) 1220. In other words, the GMSC 1210 provides interworking functionality with external networks.

The HLR 1212 is a database or component(s) that comprises administrative information regarding each subscriber registered in a corresponding GSM network. The HLR 1212 also includes the current location of each MS. The VLR 1214 is a database or component(s) that includes selected administrative information from the HLR 1212. The VLR includes information necessary for call control and provision of subscribed services for each MS currently located in a geographical area controlled by the VLR. The HLR 1212 and the VLR 1214, together with the MSC 1208, provide the call routing and roaming capabilities of GSM. The AuC 1216 provides the parameters needed for authentication and encryption functions. Such parameters allow verification of a subscriber's identity. The EIR 1218 stores security-sensitive information about the mobile equipment.

A Short Message Service Center (SMSC) 1209 allows one-to-one Short Message Service (SMS) messages to be sent to/from the MS 1202. A Push Proxy Gateway (PPG) 1211 is used to "push" (e.g., send without a synchronous request) content to the MS 1202. The PPG 1211 acts as a proxy between wired and wireless networks to facilitate pushing of data to the MS 1202. A Short Message Peer to Peer (SMPP) protocol router 1213 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1202 sends a location update including its current location information to the MSC/VLR, via the BTS 1204 and the BSC 1206. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1230 is logically implemented on the GSM core network architecture by introducing two packet-switching network nodes, a serving GPRS support node (SGSN) 1232, a cell broadcast and a Gateway GPRS support node (GGSN) 1234. The SGSN 1232 is at the same hierarchical level as the MSC 1208 in the GSM network. The SGSN controls the connection between the GPRS network and the MS 1202. The SGSN also keeps track of individual MS's locations and security functions and access controls.

A Cell Broadcast Center (CBC) 1233 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1234 provides a gateway between the GPRS network and a public packet network (PDN) or other IP networks 1236. That is, the GGSN provides interworking functionality with external networks, and sets up a logical link to the MS through the SGSN. When packet-switched data leaves the GPRS network, it is transferred to an external TCP-IP network 1236, such as an X.25 network or the Internet. In order to access GPRS services, the MS first attaches itself to the GPRS network by performing an attach procedure. The MS then activates a packet data protocol (PDP) context, thus activating a packet communication session between the MS. the SGSN, arc the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1230 can be designed to operate in three network operation modes (NOM1, NOM2 and NOM3). A network operation mode of a GPRS network is indicated by a parameter in system information messages transmitted within a cell. The system information messages dictate a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS cannot receive pages from a circuit switched domain when engaged in a data call, since the MS is receiving data and is not listening to a paging channel. In a NOM3 network, a MS can monitor pages for a circuit switched network while received data and vise versa.

The IP multimedia network 1238 was introduced with 3GPP Release 5, and includes an IP multimedia subsystem (IMS) 1240 to provide rich multimedia services to end users. A representative set of the network entities within the IMS 1240 are a call/session control function (CSCF), a media gateway control function (MGCF) 1246, a media gateway (MGW) 1248, and a master subscriber database, called a home subscriber server (HSS) 1250. The HSS 1250 can be common to the GSM network 1201, the GPRS network 1230 as well as the IP multimedia network 1238.

The IP multimedia system 1240 is built around the call/session control function, of which there are three types: an interrogating CSCF (I-CSCF) 1243, a proxy CSCF (P-CSCF) 1242, and a serving CSCF (S-CSCF) 1244. The P-CSCF 1242 is the MS's first point of contact with the IMS 1240. The P-CSCF 1242 forwards session initiation protocol (SIP) messages received from the MS to an SIP server in a home network (and vice versa) of the MS. The P-CSCF 1242 can also modify an outgoing request according to a set of rules defined by the network operator (for example, address analysis and potential modification).

The I-CSCF 1243 forms an entrance to a home network and hides the inner topology of the home network from other networks and provides flexibility for selecting an S-CSCF. The I-CSCF 1243 can contact a subscriber location function (SLF) 1245 to determine which HSS 1250 to use for the particular subscriber, if multiple HSS's 1250 are present. The S-CSCF 1244 performs the session control services for the MS 1202. This includes routing originating sessions to external networks and routing terminating sessions to visited networks. The S-CSCF 1244 also decides whether an application server (AS) 1252 is required to receive information on an incoming SIP session request to ensure appropriate service handling. This decision is based on information received from the HSS 1250 (or other sources, such as an application server 1252). The AS 1252 also communicates to a location server 1256 (e.g., a Gateway Mobile Location Center (GMLC)) that provides a position (e.g., latitude/longitude coordinates) of the MS 1202.

The HSS 1250 includes a subscriber profile and keeps track of which core network node is currently handling the subscriber. It also supports subscriber authentication and authorization functions (AAA). In networks with more than one HSS 1250, a subscriber location function provides information on the HSS 1250 that includes the profile of a given subscriber.

The MGCF 1246 provides interworking functionality between SIP session control signaling from the IMS 1240 and ISUP/BICC call control signaling from the external GSTN networks (not shown). It also controls the media gateway (MGW) 1248 that provides user-plane inter-working functionality (e.g., converting between AMR- and PCM-coded voice). The MGW 1248 also communicates with other IP multimedia networks 1254.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
determining, by a system comprising a processor, a multi-path scattering level and a signal to noise ratio of a wireless data link of a mobile device, wherein the multi-path scattering level is determined based on a metric of a signal received from the mobile device, and the multi-path scattering level provides an indication of a level of a spatial distortion scattering condition utilized to distinguish respective data streams of a group of data streams;
selecting, by the system, a multiple transceiver communication technique from different multiple transceiver communication techniques based on a first comparison of the multi-path scattering level with a first threshold and a second comparison of the signal to noise ratio with a second threshold, the selecting resulting in a selected multiple transceiver communication technique; and
instructing, by the system, a device to employ the selected multiple transceiver communication technique.

2. The method of claim 1, wherein the selecting comprises selecting a multiple data stream, multiple channel transmission technique as the selected multiple transceiver communication technique.

3. The method of claim 1, wherein the selecting comprises selecting a multiple data stream, single channel transmission technique as the selected multiple transceiver communication technique.

4. The method of claim 1, wherein the selecting comprises selecting a single channel transmit-receive diversity mode transmission technique as the selected multiple transceiver communication technique.

5. The method of claim 1, wherein the device is the mobile device.

6. The method of claim 1, wherein the device is a base station device.

7. The method of claim 1, wherein the second threshold is a quality threshold.

8. A non-transitory machine-readable storage medium, comprising executable instructions that, when executed by a processor, facilitate performance of operations, comprising:
determining a multi-path scattering level and a signal to noise ratio of a wireless data link of a mobile device, wherein the multi-path scattering level is determined based on a metric of a signal received from the mobile device, and the multi-path scattering level provides an indication of a level of a spatial distortion scattering condition utilized to distinguish respective data streams of a group of data streams;
selecting a multiple transceiver communication technique from a group of multiple transceiver communication techniques based on a first comparison of the multi-path scattering level with a first threshold and a second comparison of the signal to noise ratio with a second threshold; and
instructing a device to employ the selected multiple transceiver communication technique.

9. The non-transitory machine-readable storage medium of claim 8, wherein the selecting comprises selecting a multiple data stream, multiple channel transmission technique as the multiple transceiver communication technique.

10. The non-transitory machine-readable storage medium of claim 8, wherein the selecting comprises selecting a multiple data stream, single channel transmission technique as the multiple transceiver communication technique.

11. The non-transitory machine-readable storage medium of claim 8, wherein the selecting comprises selecting a single channel transmit-receive diversity mode transmission technique as the multiple transceiver communication technique.

12. The non-transitory machine-readable storage medium of claim 8, wherein the device is the mobile device.

13. The non-transitory machine-readable storage medium of claim 8, wherein the device is a base station device.

14. The non-transitory machine-readable storage medium of claim 8, wherein the second threshold is a quality threshold.

15. A system, comprising:
a processor; and
a memory that stores executable instructions that, when executed by the processor, facilitate performance of operations, comprising:
determining a multi-path scattering level and a signal to noise ratio of a wireless data link of a mobile device, wherein the multi-path scattering level is determined based on a metric of a signal received from the mobile device, and the multi-path scattering level is indicative of a level of a spatial distortion scattering condition utilized to distinguish respective data streams of a group of data streams;
selecting a multiple transceiver communication technique from a plurality of multiple transceiver communication techniques based on a first comparison of the multi-path scattering level with a first threshold and a second comparison of the signal to noise ratio with a second threshold; and
instructing a device to employ the selected multiple transceiver communication technique.

16. The system of claim 15, wherein the selecting comprises selecting a multiple data stream, multiple channel transmission technique as the multiple transceiver communication technique.

17. The system of claim 15, wherein the selecting comprises selecting a multiple data stream, single channel transmission technique as the multiple transceiver communication technique.

18. The system of claim 15, wherein the selecting comprises selecting a single channel transmit-receive diversity mode transmission technique as the multiple transceiver communication technique.

19. The system of claim 15, wherein the device is the mobile device.

20. The system of claim 15, wherein the device is a base station device.

* * * * *